Sept. 10, 1974   R. A. HUFFHINES, JR   3,835,014
ELECTRODE HOUSING AND HOLDER
Filed Feb. 5, 1973
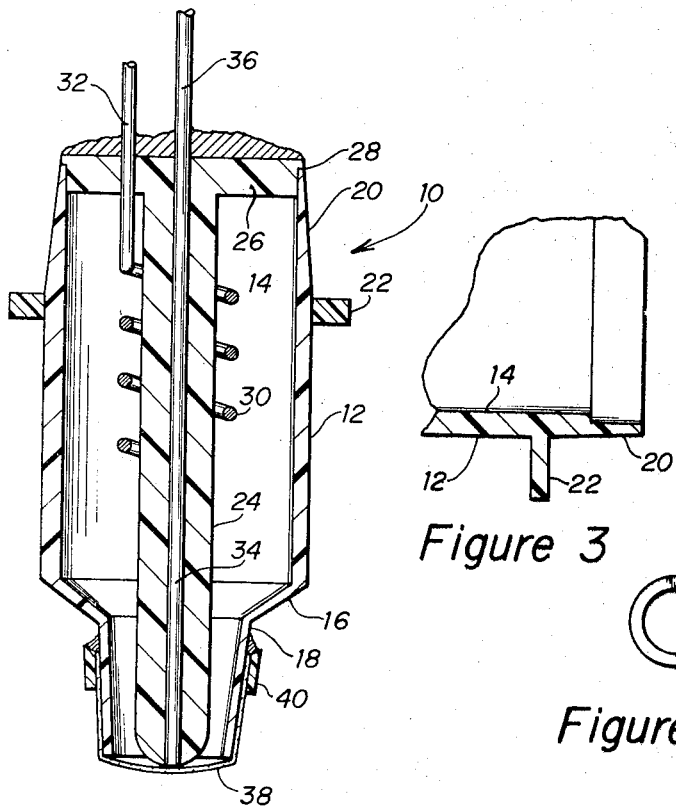
Figure 1
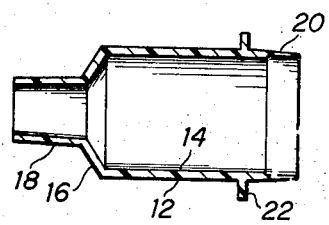
Figure 2
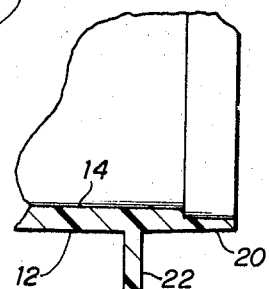
Figure 3
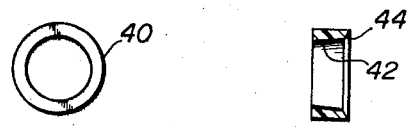
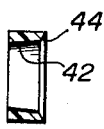
Figure 4   Figure 5
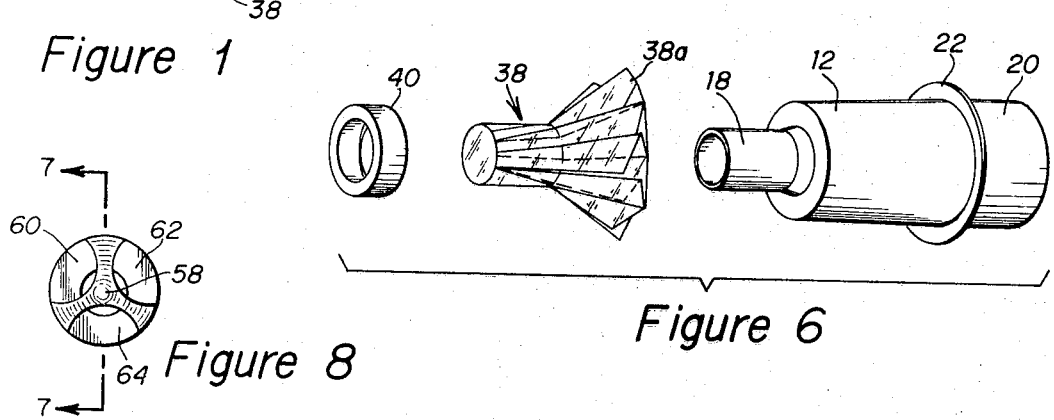
Figure 6
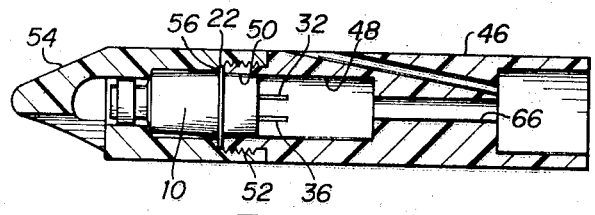
Figure 8
Figure 7

United States Patent Office 3,835,014
Patented Sept. 10, 1974

3,835,014
ELECTRODE HOUSING AND HOLDER
Robert A. Huffhines, Jr., Duncanville, Tex., assignor to
Tex-a-dyne, Dallas, Tex.
Filed Feb. 5, 1973, Ser. No. 329,373
Int. Cl. G01n 27/28, 27/30
U.S. Cl. 204—195 P                                              10 Claims

ABSTRACT OF THE DISCLOSURE

The anode and cathode of an electrode are supported in a housing having a main body contiguous with a tapered section. The tapered section is contiguous with the main body at a shoulder and tapers from the inner diameter of the shoulder to a second smaller diameter at an open end. Opposite from the tapered section, the main body includes a tapered neck section with a mounting ring at the end of the taper on the main body. At the open end of the tapered section a membrane encloses the housing chamber, this membrane extends over the tapered section and is held in place by a membrane sleeve having an internal taper for mating with the external taper of the tapered section. The membrane sleeve includes a chamfered end for folding the membrane material against the tapered section of the housing. A chemical weld between the membrane sleeve and the tapered section holds the assembly in place. A holder for the electrode housing includes a chamber having a tapered section for mating with the tapered neck section of the housing and has a coupling for engaging a shroud for protecting the electrode. The shroud includes a shoulder in an internal chamber for engaging the mounting ring of the housing.

---

This invention relates to an electrode housing, and more particularly to an electrode housing a permeable membrane enclosing one end thereof secured by a membrane sleeve.

An electrode utilizing the housing of the present invention is the subject matter of the copending United States patent application, Electrode and Apparatus for the Measurement of Free Oxygen, Ser. No. 287,864, filed Sept. 11, 1972 in the name of Robert A. Huffhines. An electrode in accordance with this copending application has utility for monitoring the oxygen content of a substance. Such an electrode includes a housing having one closed end and one open end with a tapered section terminating at the open end of the housing. A cathode having a lead wire extending from the housing and a helical coil anode, also having a lead wire extending from the housing, are supported in a spaced relationship within the housing. An oxygen permeable membrane encloses the open end of the housing and extends to at least partially cover the tapered section thereof. An annular ring is fitted over the tapered section of the housing and mates therewith to secure the membrane in place. Within the housing there is an electrolyte solution in contact with the cathode and anode.

An electrode of the type described in the above-identified patent application must be ruggedly constructed to be acceptable in the trade. In addition to being ruggedly constructed, such electrodes must be inexpensive yet accurate for reliable measuring of the chemical contents of a substance. For example, in medical diagnosis it is often necessary to accurately and reliably determine the oxygen concentration in a substance. Again in the area of human health considerations, the presence of an adequate oxygen supply in mining operations is critical to the safety of workers. Reliable and rugged electrodes are thus essential for such operations.

A feature of the present invention is to provide a relatively inexpensive electrode housing for use in electrodes for the measurement of the chemical composition of a substance. A further feature of the present invention is to provide a rugged electrode housing to withstand the critical demands required of small inexpensive electrodes. A further feature of the present invention is to provide an electrode housing for securely mounting a membrane across an opening thereof. Still another feature of the present invention is to provide an electrode housing for mounting in an electrode holder.

In accordance with the present invention, an electrode housing comprises a main body having an internal chamber with one open end for receiving a supporting member for a cathode and anode. A body section contiguous with the main body has an outer surface tapering from a first dimension at the main body to a second smaller dimension at an open end thereof, this body section includes a passage from the open end to the chamber of the main body. A membrane of a flexible material encloses the open end of the tapered body section and extends to at least partially cover the tapered section. A membrane sleeve having an internal taper to mate with the external taper of the main body section secures the membrane in place.

A more complete understanding of the invention and its advantages will be apparent from the specification and claims and from the accompanying drawings illustrative of the invention.

Referring to the drawings:

FIG. 1 is a cross section of an embodiment of an electrode housing for measuring the chemical content of a substance;

FIG. 2 is a cross section of the electrode housing of FIG. 1;

FIG. 3 is an enlarged end section of the housing of FIG. 2 showing one of the tapered ends thereof;

FIG. 4 is an end view of a membrane sleeve for securing the membrane of the electrode of FIG. 1 in place on the electrode housing;

FIG. 5 is an end view of the membrane sleeve of FIG. 4;

FIG. 6 is an exploded view illustrating the assembly of the membrane material and the membrane sleeve on the electrode housing;

FIG. 7 is a sectional view of an electrode holder including a body section and a shroud section; and FIG. 8 is an end view of the shroud section of FIG. 7.

Referring to FIGS. 1–3, the electrode 10 comprises a cylindrical main body 12 having the configuration of an open ended cylinder with a smooth inside bore 14. Joining the lower end of the straight wall main body 12 is an inwardly converging shoulder 16 joining a lower tapered section 18. Considering the outward configuration of the body 12, it includes an upper tapered neck section 20 extending from the straight wall section. The tapered sections 18 and 20 taper inwardly toward the cylinder longitudinal axis. Radially extending from the body 12 at the termination of the upper tapered section 20 is a mounting ring 22.

Assembled within the body 12 is an elongated support 24 having an enlarged shoulder 26 and an upper flange 28. The upper end of the body 12 is closed by inserting the support 24 such that the shoulder 26 mates with the smooth inside bore 14 and the flange 28 rests on the edge of the cylinder.

Encircling the support 24 is a helical anode 30 having a lead wire 32 extending through the shoulder 26 from the body 12. Positioned within the center of the support 24 is a cathode wire 34 terminating in a lead 36 also extending from the shoulder 26. Thus, the support 24 positions the helical coil anode 30 and the cathode 34 in the electrode housing.

After filling the housing with an electrolyte, as described in the patent application Electrode and Apparatus for the Measurement of Free Oxygen, Ser. No. 287,864, through the lower tapered section 18, a flexible material membrane 38 is wrapped around the open end of the tapered section 38 and extends upward to a point proximal of the inwardly converging wall 16. With the support 24 extending below the open end of the tapered section 18, the membrane 38 assumes a slight curvature when assembled onto the body 12.

A membrane sleeve 40, having an inner taper to mate with the taper of the section 18, is fitted over the membrane 38, thereby securing the membrane to the body 12. The membrane is then trimmed at the upper surface of the membrane sleeve 40 and the sleeve is chemically welded to the section 18 to hold the sleeve in place and provide a fluid tight seal around the trimmed edge of the membrane. Typically the chemical weld is made using a solvent for both the sleeve 40 and the tapered section 18.

Referring specifically to FIGS. 4 and 5, the membrane sleeve 40, in addition to the tapered section 42, also includes a chamfered end 44 at the large diameter end of the taper 42. This chamfer provides a folding action to the material of the membrane 38 to provide a snug fit of the membrane around the tapered section 18.

Referring to FIG. 6, there is shown an exploded view of the assembly of the membrane sleeve 40 for securing the membrane 38 to the tapered section 18 of the body 12. As the membrane sleeve 40 is assembled onto the tapered section 18, the membrane 38 folds in a manner as illustrated. The folds provide an even distribution of the membrane material around the tapered section 18. After assembling the membrane sleeve 40 to hold the membrane 38 onto the tapered sleeve 18, the skirt portion 38a is removed as explained. The chemical weld is then made in the area of the chamfer 44.

Referring to FIGS. 7 and 8, in a typical application for use of the electrode of FIG. 1, the electrode 10 is assembled into a holder 46 having a chamber 48 for receiving the tapered section 20 of the body 12. To provide a fluid tight fit between the section 20 and the inner wall of the chamber 48, the open ended portion of the chamber has an outwardly diverging taper section 50 to mate with the inwardly diverging taper of the section 20. With the electrode 10 inserted into the holder 46, the mounting ring 22 is positioned against the outer edge of a coupling member 52. As illustrated, the coupling 52 is an externally threaded section extending from the main body of the holder 46.

To secure the electrode 10 in the holder 46, a shroud 54 includes an internally threaded section engaging the external threads of the coupler 52. At the inward most end of the internally threaded section for the shroud 54 there is formed a radially inwardly directed shoulder 56 for engaging the mounting ring 22. This securely holds the electrode 10 in the holder 46.

As best illustrated in FIG. 8, the shroud includes a passage 58 terminating in the outlets 60, 62 and 64 for allowing exposure of the membrane 38 to a substance the chemical composition of which is to be measured.

Extending through the holder 46 from the chamber 48 is a channel 66 for carrying a cable for connecting to the lead wires 32 and 36 of the electrode. When the connecting cable is in place within the channel 66 a sealant is forced around the cable to provide a fluid tight seal and thereby prevent flooding of the chamber 48.

As an alternate to the electrode and holder of FIG. 7, the eletcrode body 12 is molded as a part of the holder 46. The entire support 24 and connecting cable is then assembled through an enlarged channel 66 into the body 12. In this alternate embodiment, the inner walls of the chambelr 48 are straight leading into the chamber of the body 12.

While only one embodiment of the invention, together with modifications thereof, has been described in detail herein and shown in the accompanying drawings, it will be evident that various further modifications are possible without departing from the scope of the invention.

What is claimed is:

1. An electrode housing, comprising in combination:
   a main body having an externally tapered neck section tapering to a smaller diameter at an open end thereof and including an internal chamber for receiving at the open end of the body a cathode and anode support,
   a mounting ring encircling a main body at the neck section opposite the open end,
   a body section contiguous with said main body having an outer surface tapering from a first diameter at the main body to a second smaller diameter at an open end thereof, said section including a passage from the open end to the chamber of said main body,
   a membrane of a flexible material enclosing the open end of said body section and extending to at least partially cover the tapered section thereof, and
   a membrane sleeve having an internal taper to mate with the taper of said body section to secure the membrane thereto.

2. An electrode housing as set forth in Claim 1 wherein said membrane sleeve includes a chamfered end at the larger diameter of the internal taper.

3. An electrode housing as set forth in Claim 1 including a chemical weld for securing said membrane sleeve to said body section.

4. An electrode housing, comprising in combination:
   a holding fixture including a body having a chamber therein with one open end and coupling means at the opposite end,
   an electrode case contiguous with said holding fixture having an outer surface tapering from a first dimension to a second smaller dimension at an open end thereof, said electrode case including a passage from the open end to the chamber of the holding fixture,
   a membrane of a flexible material enclosing the open end of said electrode case and extending to at least partially cover the tapered section thereof,
   a membrane sleeve having an internal taper to mate with the taper of said case to secure the membrane thereto, and
   a shroud with a chamber therein for enclosing said case and membrane and including openings into said chamber, said shroud having coupling means for mating with the coupling means of said holding fixture to form a single unit therewith.

5. An electrode housing as set forth in Claim 4 wherein said electrode case includes a main body removable from said holding fixture and having a chamber therein with one open end for receiving a cathode and anode support, and
   a body section contiguous with said main body having an outer surface tapering from a first dimension at the main body to a second smaller dimension at the open end thereof.

6. An electrode housing as set forth in Claim 5 wherein said main body includes a neck section having an external taper from the maximum dimension of the main body to a smaller dimension at the open end thereof, and said holding fixture includes an internal taper at one end thereof for mating with the external taper of the neck section of said main body.

7. An electrode housing as set forth in Claim 6 including a mounting ring encircling the main body between said main body and said neck section.

8. An electrode housing as set forth in Claim 7 wherein said shroud includes a radially inwardly directed shoulder in the chamber therein for engaging said mounting ring of the main body to secure said main body to the holding fixture.

9. An electrode housing as set forth in Claim 5 wherein said membrane sleeve includes a chamfered end at the large diameter of the internal taper.

10. An electrode housing as set forth in Claim 9 including a chemical weld for securing said membrane sleeve to said body section.

References Cited
UNITED STATES PATENTS

| | | | |
|---|---|---|---|
| 3,259,124 | 7/1966 | Hillier et al. | 204—195 P X |
| 3,098,813 | 7/1963 | Beebe et al. | 204—195 P |
| 3,468,781 | 9/1969 | Lucero | 204—195 P |
| 3,723,280 | 3/1973 | Harnoncourt et al. | 204—195 P |

GERALD L. KAPLAN, Primary Examiner